R. H. RUDOLPH.
LEATHER STITCHING MACHINE.
APPLICATION FILED NOV. 20, 1915. RENEWED MAY 13, 1918.

1,295,070.

Patented Feb. 18, 1919.
8 SHEETS—SHEET 1.

Fig. 1.

Witness:
Leo J. Dumais

Inventor:
Raymond H. Rudolph
By Chas. C. Tillman
Atty.

R. H. RUDOLPH.
LEATHER STITCHING MACHINE.
APPLICATION FILED NOV. 20, 1915. RENEWED MAY 13, 1918.

1,295,070.

Patented Feb. 18, 1919.
8 SHEETS—SHEET 4.

Witness:
Leo J. Dumais

Inventor:
Raymond H. Rudolph
By Chas. C. Tillman.
Atty.

R. H. RUDOLPH.
LEATHER STITCHING MACHINE.
APPLICATION FILED NOV. 20, 1915. RENEWED MAY 13, 1918.

1,295,070.

Patented Feb. 18, 1919.
8 SHEETS—SHEET 8.

UNITED STATES PATENT OFFICE.

RAYMOND H. RUDOLPH, OF CHICAGO, ILLINOIS, ASSIGNOR OF ONE-HALF TO CHARLES FRIEDMAN, OF CHICAGO, ILLINOIS.

LEATHER-STITCHING MACHINE.

1,295,070.  Specification of Letters Patent.  Patented Feb. 18, 1919.

Application filed November 20, 1915, Serial No. 62,455. Renewed May 13, 1918. Serial No. 234,344.

*To all whom it may concern:*

Be it known that I, RAYMOND H. RUDOLPH, a citizen of the United States, and resident of Chicago, in the county of Cook and State of Illinois, have invented certain new and useful Improvements in Leather-Stitching Machines, of which the following is a specification.

This invention relates to improvements in a machine which is primarily and principally intended for use in sewing together the parts of shoes in the manufacture or repairing thereof, and it consists in certain peculiarities of the construction, novel arrangement and operation of the various parts thereof, as will be hereinafter more fully set forth and specifically claimed.

The principal object of the invention is to provide a machine of the above named general character, which shall be simple and inexpensive in construction, easily operated, strong and durable, with its parts so made and arranged with respect to one another, that the various parts of shoes or boots or other articles can be easily reached and stitched together in a strong and secure manner. A further and very important object of the invention is to provide improved means whereby to effect the interlocking of two threads, forming what is termed a "double-lock-stitch," located within the parts being sewed or stitched together.

A still further object of the invention is to provide means for positively determining the position of and locating the stitches as well as regulating them.

Numerous other objects and advantages of the invention will be disclosed in the subjoined description and explanation.

In the accompanying drawings, which serve to illustrate the invention—

Like numerals of reference refer to corresponding parts throughout the different views of the drawings.

The reference numeral 20 designates the base or bed plate of the machine, which plate forms a part of the main or supporting frame thereof and may be mounted on a stand or other suitable support, not shown. This plate may be made of any suitable size, form and material, but in the present instance, is shown as being substantially rectangular in shape with a recess 21 located in its front end about mid-way between its sides for the reception and operation of a part of the machine. At its rear end, the base or plate 20 is provided about mid-way between its sides with another recess 22 for the reception of a pair of upwardly and rearwardly extended lugs 23 which are spaced apart and are secured or mounted on a bar 24 secured transversely to the bottom of the base 20 across the recess 22 thereof. On each side of the recess 21 in the front of the machine, is mounted a standard 25 each of which has on its upper end a journal-box 26 in which is transversely and horizontally journaled a shaft 27 which extends outwardly from each of said journal boxes. Said shaft has mounted on one of its ends a sprocket wheel 28 and on its other end a tripping arm 29 and a cam 30, which is interposed between the arm 29 and the box 26 adjacent thereto, the purposes and functions of said members being hereinafter explained.

Figure 1:
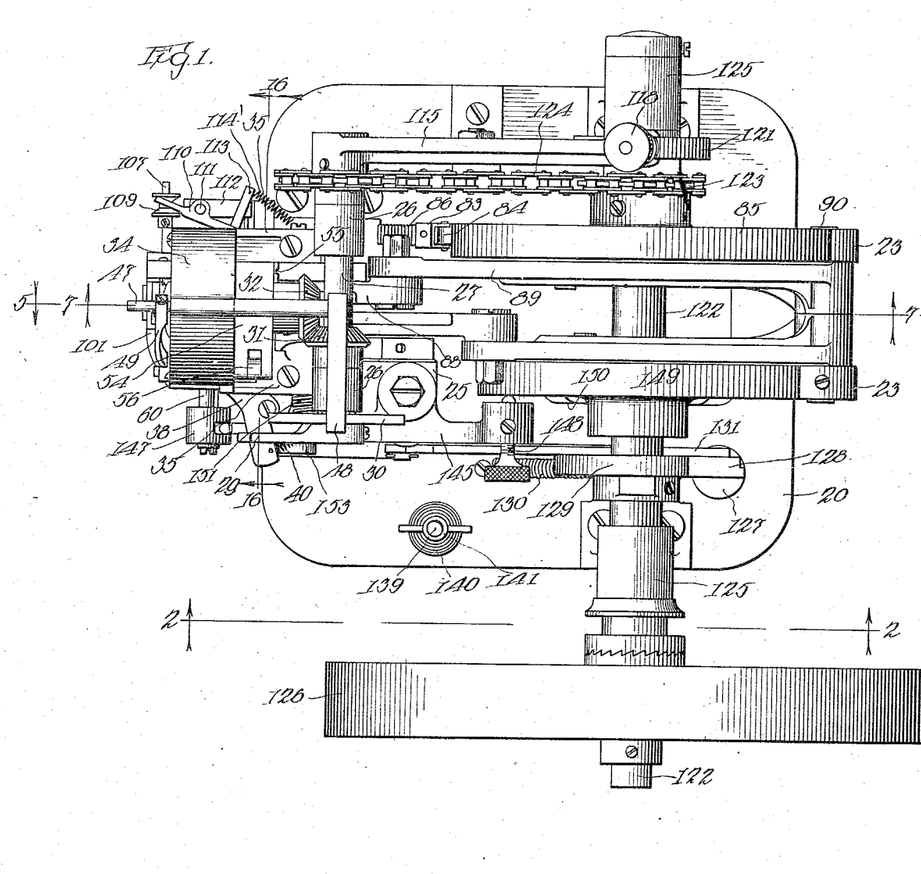
Figure 1 is a plan view of the machine.
Figure 2:
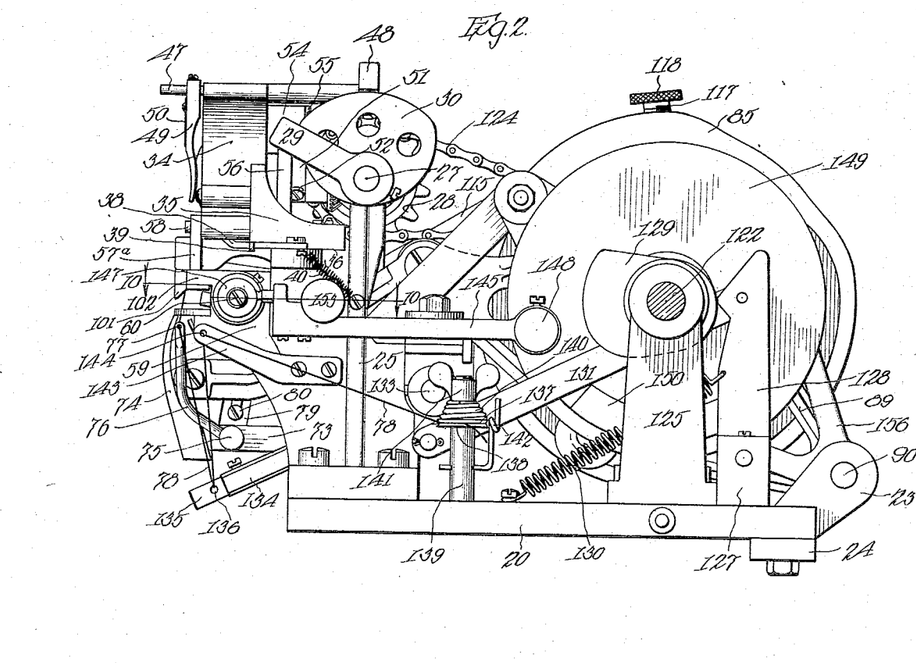
Fig. 2 is a side view in elevation taken on line 2—2 of Fig. 1 looking in the direction indicated by the arrows.
Figure 3:
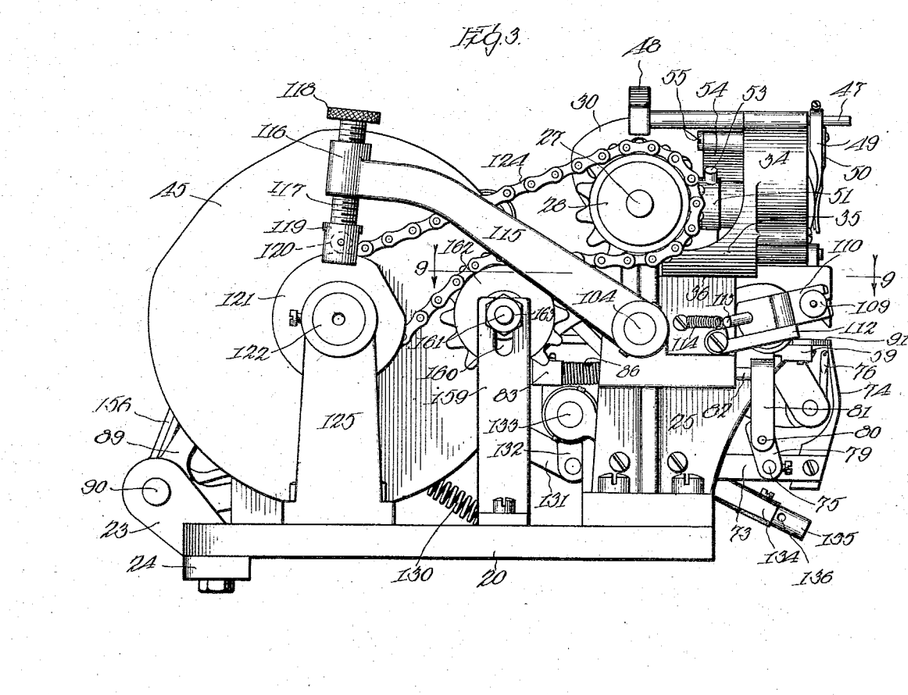
Fig. 3 is a similar view of the opposite side of the machine from that shown in Fig. 2.
Figure 4:
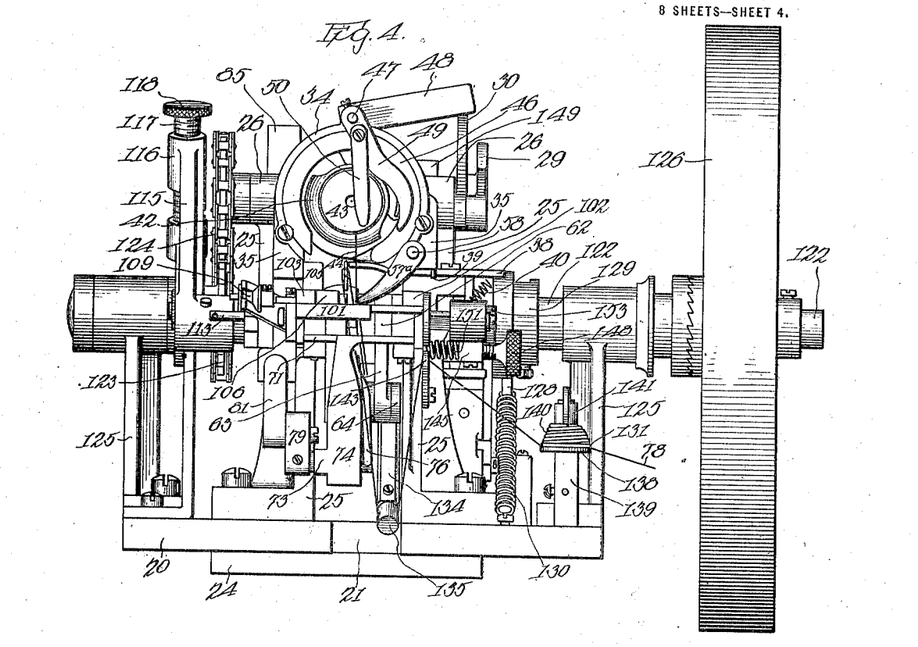
Fig. 4 is a front view in elevation.
Figure 5:
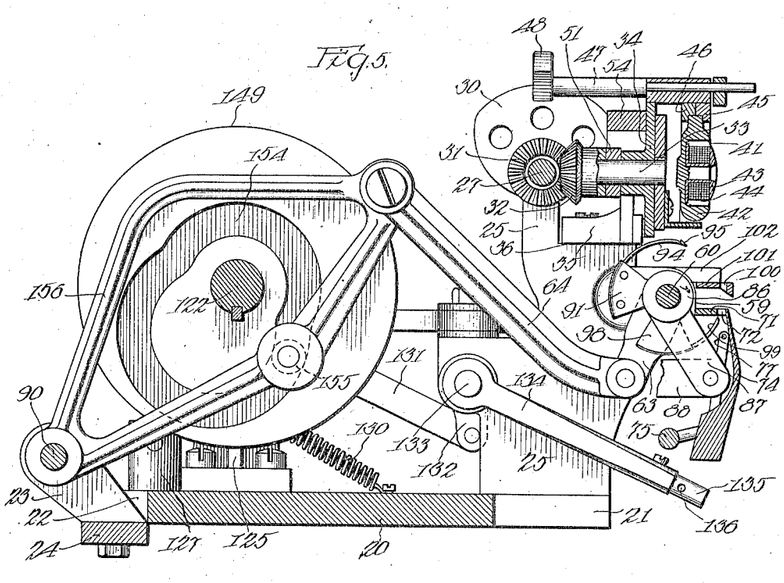
Fig. 5 is a fragmental view partly in section and partly in elevation of the front part of the machine taken on line 5—5 of Fig. 1 looking in the direction indicated by the arrows 5—5 and illustrating the mechanism for operating the awl and its carrier or holder in the lowered position of the same.
Figure 6:
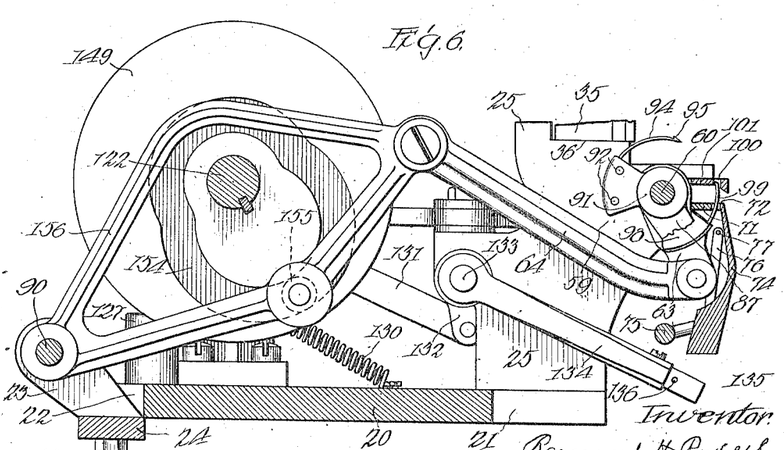
Fig. 6 is a similar view of like parts taken on the same line with the shuttle operating mechanism and bobbin carrier omitted, showing another position of the parts used for operating the awl and its carrier, the same being shown in their raised positions.

Mounted on the shaft 27 inwardly of the bearing 26 adjacent to the cam 30 is a beveled gear 31 which meshes with a similar gear 32 fixed to the rear end of a shaft 33 which extends horizontally and forwardly from the shaft 27 and is journaled in a casing or housing which is designated as a whole by the reference numeral 34 and as is clearly shown in Figs. 4 and 5 of the drawing is circular in shape with a vertical rear wall in which the shaft 33 is journaled. The lower portion of the casing 34 has on each of its sides a rearwardly and horizontally projected extension 35 which are adapted to rest on and to be secured by means of screw-bolts or otherwise to the horizontally and forwardly extended portions 36 with which each of the standards 25 is provided at a suitable distance below its upper end. One of the horizontal portions 36 is provided with a lateral extension 37, see Fig. 9, to which is pivotally secured, near one of its ends a stripper arm 38 which is adapted to operatively lie under one of the extensions 35 of the casing and to be checked in its outward movement by means of a projection 39 depending from said extension. The outer portion of the arm 38 has connected thereto, one end of a spring 40, the other end of which is secured to the standard 25 adjacent to said arm, and said spring is used to normally hold the stripper arm 38 in its extended position as is clearly shown in Fig. 9 of the drawings. That portion of the arm 38 to which the spring 40 is connected is extended into the path traversed by the arm 29 in the rotation of the shaft 27 on which the last named arm is mounted so as to be actuated thereby at the proper time. Mounted on the front end of the shaft 33 is a disk 41 or carrier for the shuttle 42 which is of the ordinary or well known rotary shuttle type and carries a bobbin 43 of the usual floating type on which the upper or bobbin thread 44 is wound. The shuttle 42 is held in place by means of a circular member 45 inserted in the front end of the casing 34 and a race 46 located within the casing at a suitable distance from its front end. As the operation of the shuttle and bobbin is well known, and as I do not place any claims on the construction thereof, it is not deemed necessary to further describe their construction or operation, except to say, that the bottom of the casing 34 is open so as to allow of the free action of the stripper arm between the needle and the shuttle. Mounted longitudinally with respect to the machine, and on the upper portion of the casing 34 is a rock shaft 47 which projects both forwardly and rearwardly of the casing 34 and has on its rear portion a laterally extended arm 48 which projects over and is adapted to contact with the cam 30. Forwardly of the casing 34, the shaft 47 has mounted thereon and fixed thereto a depending arm which has its lower portion curved as is clearly shown in Fig. 4 of the drawings and carries a depending spring 50, the latter, adapted to rest against the front face of the bobbin in order to hold the same in its place by tension, and the arm 49 being adapted to rest part of the time on the ring 45 which holds the shuttle in place, but to be moved by the gravity of the arm 48 and the action of the cam 30 so as to move the bobbin thread 44 into the proper position, should said thread become stuck between the bobbin and the shuttle on account of the wax thereon.

Figure 16:
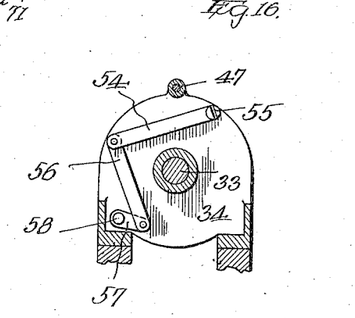
Fig. 16 is a vertical sectional view taken on line 16—16 of Fig. 1 looking in the direction indicated by the arrows showing the means for operating the pickup-arm for the lower thread.

Surrounding the shaft 33, forwardly of the gear 32 thereon is a collar 51 which may be fixed to said shaft by means of a set screw 52 which is extended through said collar to engage said shaft, and is used for adjusting the collar on the same. The collar 51 has projecting therefrom a pin 53 adapted to contact with an arm 54 which is pivotally mounted at one of its ends on a screw-bolt 55 engaging the upper rear portion of the casing 34 at one side of the rock shaft 47. (see Fig. 16 of the drawings). The arm 54 has pivotally secured to its free end one end of a link 56 which depends on the opposite side of the shaft 33 from the pivot 55 of the arm 54 and is pivotally connected at its lower end to a crank arm 57 on a shaft 58 which is horizontally and longitudinally journaled on the lower portion of the casing 34 at one side of the opening in the lower portion of said casing and said shaft has mounted on its front portion a pickup-arm 57ᵃ adapted to engage the sewing-thread as will be presently explained.

Figure 7:
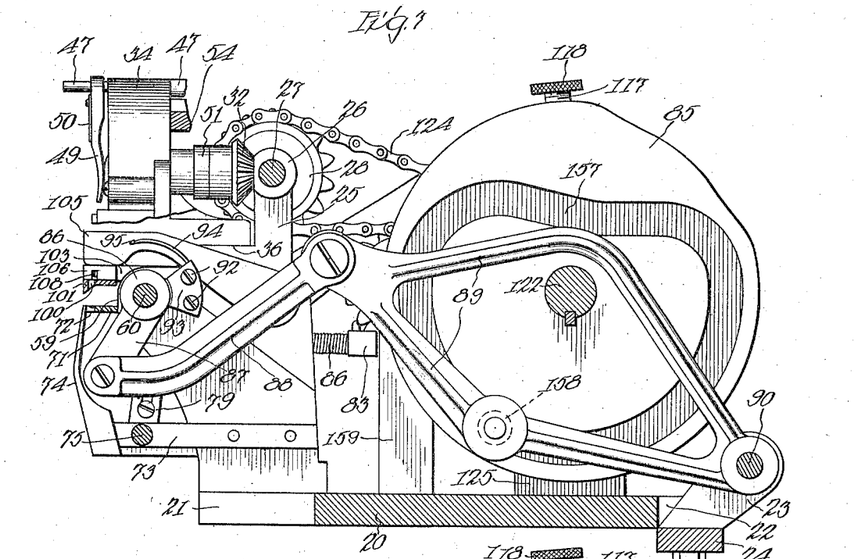
Fig. 7 is a fragmental view partly in section and partly in elevation taken on line 7—7 of Fig. 1 looking in the direction indicated by the arrows at 7—7 and illustrating the mechanism for operating the needle, the same being shown in its raised position.
Figure 8:
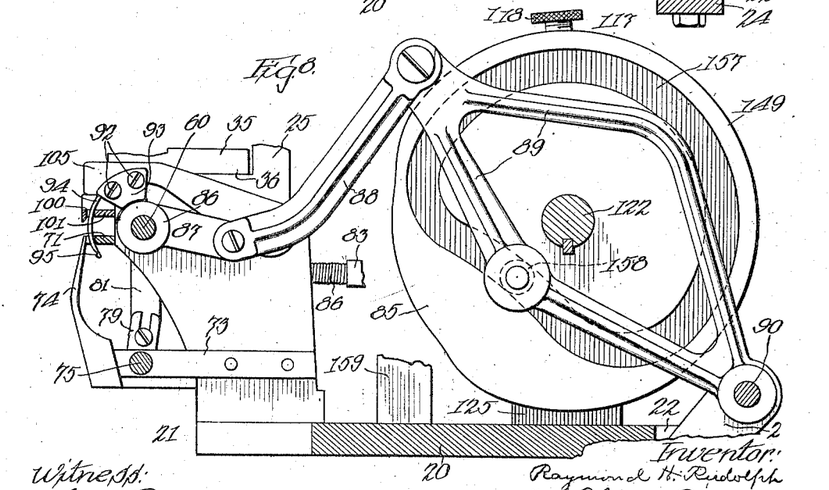
Fig. 8 is a similar view taken on the same line showing the parts for operating the needle, but with the latter in its lowered position.

Horizontally and transversely journaled on the forwardly extended portions 59 of the standards 25, which portions are located a slight distance below the horizontal ledges or portions 36 of said standards, is an awl and needle carrying shaft 60 which projects outwardly from each of the extended parts 59 of the standards 25 as is clearly shown in Figs. 9 and 10 of the drawings. Surrounding the shaft 60 near one of its ends is a sleeve 61 which is provided with an angular opening to receive a correspondingly shaped portion of said shaft, so that the shaft may slide therein but will turn with the sleeve. This sleeve has on its inner end a head 62 or annular flange from which is extended an arm 63 which is pivotally connected at its opposite end to a link 64 at the front end thereof. Externally of the extension 59 on which the sleeve 61 is mounted is a collar 65 which may be secured in place by means of a set-screw 66 extended through said collar and adapted to engage said sleeve. The extension 59 opposite that in which the sleeve 61 is located, is provided with a reduced portion 67 around which is fitted a collar 68 having a set-screw 69 by which it is fixed in position on said reduced portion which surrounds the shaft 60 near the adjacent end thereof, which end is provided with a head 70 for the purpose to be presently explained. Horizontally mounted on the extreme front portions of the extensions 59 of the standards 25 is a throat plate 71 which is provided with a slot 72 for the passage of the awl and needle, as well as, for the passage of the threads used in sewing the material. This throat plate on which the work will rest when the latter is being stitched, is rigidly held in a horizontal plane slightly below the plane of the shaft 60 and projects at its front edge to about a vertical line reached by the mechanism below said plate in the front portion of the machine. Extended forwardly and horizontally from the lower portion of one of the standards 25 and on the inner surface thereof is a bar 73 from the front end of which is projected upwardly an arm 74, the upper end of which contacts with or proximates the throat plate 71 and forms a guard or protector to prevent the work on the throat plate being interfered with by the mechanism located below the same. On the bar 73, near its front end, is transversely journaled a stub-shaft 75 which projects from said bar on each side thereof and has its inner end extended to near the edge of the guard or protector 74 opposite the bar 73 as will be understood by reference to Fig. 4 of the drawings. To its inner portion is secured a forwardly and upwardly extended thread placer arm 76 which has at its upper end an eye or opening 77 for the lower or spool thread 78, the arrangement and location of which will be hereinafter explained. Mounted on the stub-shaft 75 outwardly of the bar 73 and fixed to said shaft is a vertically slotted link 79 to which is pivotally secured at its lower end by means of a screw-bolt 80 extended through said slot, another link, 81, see Figs. 3 and 4, which latter link has rearwardly extended from its upper portion a rod 82 which passes through a suitable horizontal opening in the standard 25 which supports the parts just above mentioned. The rod 82 has on its rear end a head 83 which carries a roller 84 adapted to contact with the periphery of a cam disk 85 mounted on the driving shaft of the machine. Surrounding the rod 82 between the head 83 thereon and the standard 25, through which said rod is extended is a coiled spring 86 which serves to hold the roller 84, carried by said shaft in contact with the cam disk 85 so as to operate through the instrumentality of the links 79 and 81 and shaft 75, the thread placer arm 76 which, as shown in Figs. 2, 3, 5 and 6 of the drawings terminates at its upper end a slight distance below the throat plate so as to present the thread to the needle in order to be engaged thereby after the same has been projected through the slot in the throat plate. Rotatably mounted on the shaft 60 adjacent to and inwardly of one of the extensions 59 of the standards 25 is a needle carrier which consists of a collar 86 which loosely surrounds the shaft 60, the said collar having an arm 87 extended therefrom, see Figs. 7 and 8 to which arm is pivotally connected at one of its ends a link 88, the other end of which is connected to the front end of frame like lever 89 which is pivotally mounted on a shaft 90 journaled in the brackets or extensions 23 on the rear portion of the base or bed plate of the machine. The collar 86 of the needle holder also has extended therefrom an arm 91, see Fig. 9, to which is secured on one of its sides, by means of screws 92, a clamping plate 93 between which plate and the arm or projection 91 is interposed the butt end of a curved needle 94 which has its front end pointed and near said end a barb or hook 95 to engage the thread in the operation of the machine. The awl holder, see Figs. 5, 6, 9 and 10 consists of a collar 96 which is fixed on the shaft 60, between the needle holder or carrier and the inner end of the sleeve 61 by means of a pin 97 extended through the collar 96 and shaft 60 or otherwise, so as to rotate with said shaft and to be moved with the longitudinal movement therewith. The collar 96 of the awl carrier or holder has extended therefrom an arm 98 which has mounted on its outer or free portion an upwardly curved awl 99 adapted to be projected through the slot 72 of the throat plate 71 and into the slot 100 of the presser-foot bar 101 which is horizontally and transversely mounted above the throat-plate 71 on a pair of arms 102 and 103, the arm 102 being loosely mounted at its rear end on the sleeve 61 surrounding the shaft 60 between the collar 65 on said sleeve and the flange 62 of the latter, while the arm 103 is loosely mounted at its rear end on the reduced portion 67 of the extension 59 of one of the standards 25, and said arm is held in place on said reduced portion by means of the collar 68 which is fixed to said portion.

Figure 9:
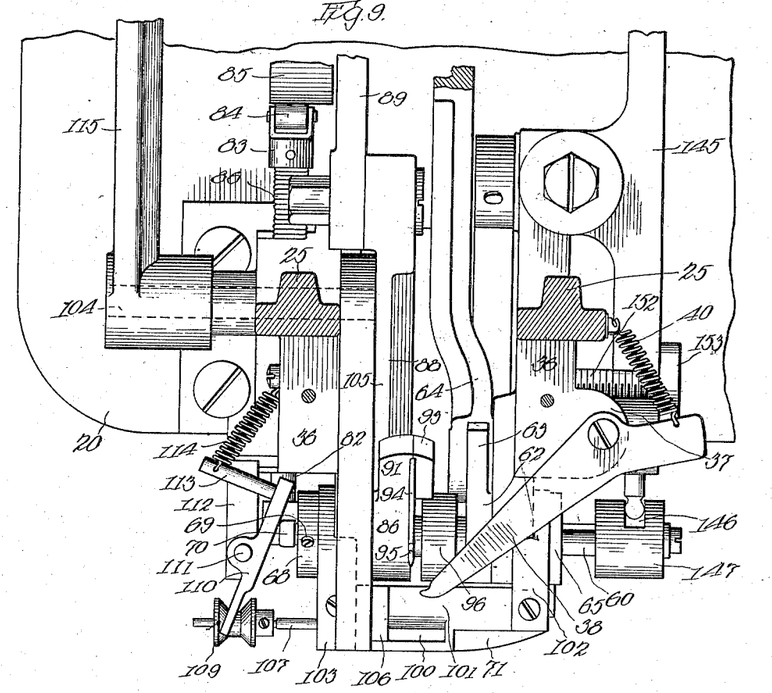
Fig. 9 is an enlarged fragmental plan view taken on line 9—9 of Fig. 3.
Figure 10:
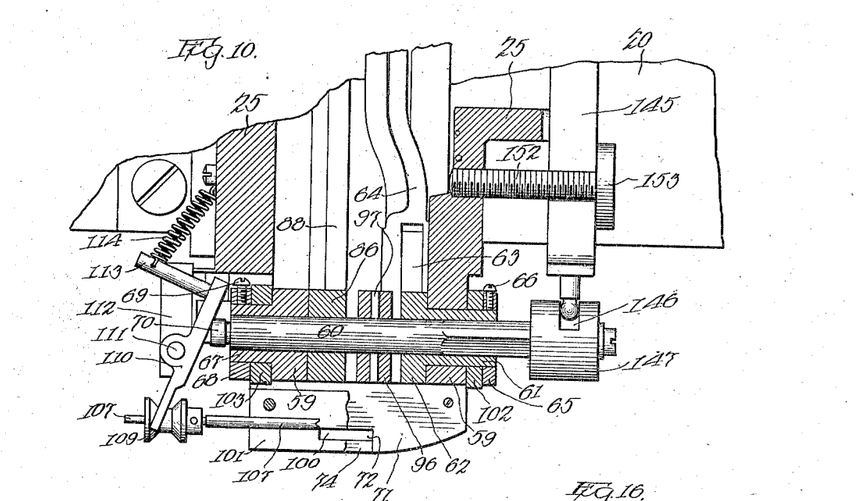
Fig. 10 is a similar view taken on line 10—10 of Fig. 2.

Extended horizontally through the standard 25, adjacent to the needle carrier, is a shaft 104 which has fixed to its inner end a bar 105 which extends forwardly and over a portion of the arm 103 and a block 106 which are secured to the upper surface of the presser-bar 101 near one of its ends as is clearly shown in Figs. 4 and 9 of the drawings. The arm 103 and block 106 not only serve to support one end of the presser-bar 101, but also act as guides for a thread guiding rod 107 which is extended through suitable transverse openings 108 and in the arm 103 and the block 106 so that its notched inner end will lie slightly to the rear of the slot 100 in the presser-bar as is clearly shown in Fig. 10 of the drawings. The rod 107 has adjustably secured on its outer portion a spool shaped member 109 to engage the prongs of a member 110 which is fulcrumed on a vertical pin 111 carried by an arm 112 pivotally secured at its rear end to the standard 25 in front of the shaft 104 mounted thereon. The member 110 has on its rear portion a laterally extended rod 113 to which is secured one end of a spring 114, the other end of which is fastened to the said standard. The member 110 is so located that it will rest against or contact with the head 70 on the shaft 60, see Fig. 10, so that in the longitudinal movement of said shaft the pivoted member 110 will be moved outwardly at its rear portion thus causing the rod 107 with which said member engages, to be moved inwardly along the rear end of the slot 100 in the presser-bar for the purpose to be presently explained. The shaft 104 has fixed to its outer end an arm 115 which is provided at its free end with a screw threaded socket 116 in which is located a screw 117 which has on its upper end a disk or knob 118 used for turning the same. On the lower end of the screw 117 is swiveled a forked hanger 119 which carries a roller 120 adapted to contact with the periphery of a cam 121 mounted on the driving shaft 122 outwardly of a sprocket wheel 123 mounted on the same shaft near one of its ends and which is geared to the sprocket wheel 28 by means of a sprocket chain 124. By adjusting the screw 117 on the arm 115 it is apparent that the position of the presser-bar 101 with respect to the throat-plate 71 can be regulated so as to suit different thicknesses of work which is located between said presser-bar and throat-plate and so that the work will be firmly clamped between the same, yet will be released for movement when required. The driving shaft 122 is horizontally journaled on a pair of standards 125 one of which is mounted on each side of the base 20 near its rear end. Mounted on one end of the driving shaft 122 is a wheel or pulley 126 to which power for driving the machine may be applied through the medium of a belt, not shown, or the driving shaft may be otherwise driven as is obvious. Located vertically and rearwardly of the driving shaft and on the base 20 near the wheel or pulley 126 is a short standard 127, see Fig. 2, to which is pivoted a cam-arm 128 which has its upper portion upwardly and rearwardly beveled and adapted to contact with a cam 129 mounted on the driving shaft in front thereof. Connected at one of its ends to the cam-arm 128 is a spring 130 which is secured at its other end to the base 20, the said spring being employed to hold the cam-arm 128 in constant contact with a cam 129. Pivotally secured at one of its ends to the upper portion of the arm 128 is a bar 131 which is pivotally connected at its other end to a crank arm 132 fixed on a shaft 133 horizontally journaled on the lower portion of the standard 25 adjacent to the driving wheel or pulley. Fixed at one of its ends to the shaft 133 is a socketed gravity arm 134 in the free end of which is adjustably fitted a member 135 which has a transverse opening 136 for the reception of the lower or spool thread 78, which is extended from a suitably located spool, between plates 137 and 138 mounted on a standard 139 located on the base 20 in front of the driving shaft adjacent to the driving wheel. The upper plate 137 is pressed toward the plate 138 by means of a coiled spring 140 surrounding the upper portion of the standard 139, the tension of which spring can be regulated by means of a nut 141 which engages the upper portion of said standard. A guide loop 142 supported by the standard 139 may be used for the passage of the thread 78 from the spool, not shown, to and through a thread carrying arm 143 which has an eye 144 in its front end, and said arm is secured to one of the standards 25 and projects below the shaft 60 near one end of the throat plate as is clearly shown in Figs. 2 and 4 of the drawings, from which views it will be seen that the thread 78 is extended from the tension plates 137 and 138 between which it passes to and through the eye 144 of the arm 143, and from thence downwardly and through the eye 136 of the takeup member 135 and from thence upwardly through the opening 77 in the arm 76 which arm is operated through the instrumentality of its connections with the cam 85 as above described. Horizontally and pivotally mounted on the rear portion of the standard 25 on which the arm 143 is secured, is an arm 145 which is extended longitudinally with respect to the machine and has its front end extended into a groove 146 of a collar 147 which is mounted on the shaft 60 near one of its ends. The opposite end of the arm 145 has extended transversely therethrough a screw 148, the inner end of which approximates the outer face of a disk 149, which disk is mounted on the driving shaft and has on said face a cam rib 150, which in the rotation of the disk 149 will cause the rear end of the arm 145 to be moved outwardly and the inner one as well as the collar 147 and shaft 60 to be moved inwardly and retained in such position until the end of the screw 148 is out of contact with the rib 150 when by reason of the action of a spring 151 interposed between the front portion of the arm 145 and adjacent surface of the standard 25 which supports said spring, the front portion of the arm 145 will be moved outwardly and the rear portion thereof inwardly. By this means the shaft 60 which carries with it the awl carrier 96 will be moved back and forth in its bearings, so that when the awl pierces the leather or goods being sewed it will also move the leather or goods laterally on the throat-plate. This movement can be regulated by means of a screw 152 which is seated in the standard 25 and has on its outer end a head 153 to rest against the outer surface of the arm 145 near its front end. By adjusting the screw 152 it is obvious that the stroke of the arm 145 will be correspondingly regulated so that the stock or goods may be properly moved to regulate the length of the stitches therethrough.

The disk 149 is provided on its inner face with a cam race or groove 154 for the reception and operation of a roller 155 carried by the frame like link or lever 156 which is pivotally connected at one of its ends to the rear end of the link or member 64 and at its other end to the shaft 90 on the rear part of the supporting frame.

The cam disk 85 which is also mounted on the driving shaft 122 but near the sprocket chain 124 has in its inner face a cam groove or race 157 for the reception of a roller 158 journaled on the frame like lever or link 89, the connections of which have been previously set forth.

Vertically mounted on the base 20 near its edge, adjacent to the sprocket chain 124 is a standard 159 which has in its upper portion a slot 160 for the reception of a stub shaft 161 on which is mounted a sprocket wheel 162 or idler for the sprocket chain 124 which passes over said idler. The idler or wheel 162 can be suitably adjusted by moving its shaft 161 up or down in the slot 160 and fixing said shaft at the desired place by means of a nut 163 engaging one end of the shaft 161 of the idler.

Figure 11:
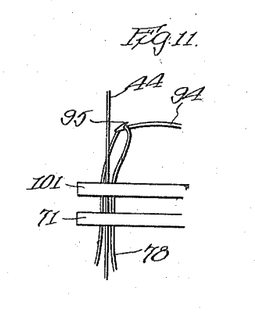
Figs. 11, 12, 13 and 14 are diagrammatic views of portions of the threads illustrating them extended through the openings of the throat-plate and presser-foot-bar and showing the manner and means for forming or producing the double-lock-stitches.
Figure 12:
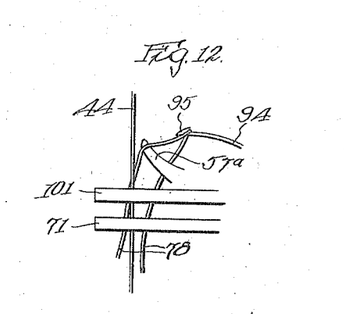
Figure 13:
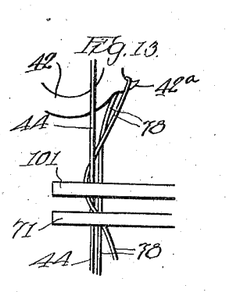
Figure 14:
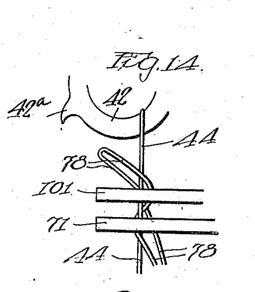
Figure 15:
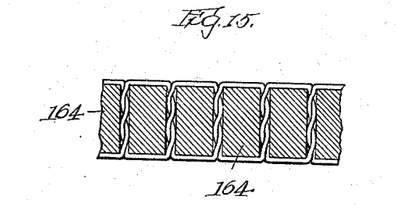
Fig. 15 is a sectional view through a portion of the work which has been sewed, said section being taken on a line with the stitches to show them in their completed form or condition.

From the foregoing and by reference to the drawings it will be readily understood and clearly seen that when the parts are assembled as above set forth and shown in the drawings, and the coöperating parts are timed or adjusted in synchronism, the stock or goods to be sewed, which is indicated in Fig. 15 of the drawings by the reference numeral 164 may be placed on the throat-plate 71 over the slot 72 therein, when the presser-foot-bar may be caused to clamp the stock or goods with the desired pressure by adjusting the screw 117 on the arm 115 so as to raise or lower the bar 105, the front end of which projects over the bar 101 and contacts with one of the supporting arms therefor in such a way as to force the presser-bar downwardly on the stock. By applying power to the driving shaft, which may be done through the medium of the pulley or wheel 126, or otherwise, it is manifest that the needle and awl carrying shaft 60 as well as the shuttle operating shaft 33 will be caused to rotate by reason of their connections or gearing with the driving shaft. As the shaft 60 is rotated the awl 99 mounted thereon will be forced upwardly through the slot 72 in the throat-plate and through the leather or stock, thus piercing a hole in the same, and when this is done the shaft 60 to which the awl carrier is fixed will be moved to the left, thus causing the awl to move the stock in the same direction so that the opening formed by the awl will be located in the path of the needle, when the shaft 60 will be reversed in its rotary movement, thus withdrawing the awl from the opening which it has formed in the stock, so that the needle may pass through said opening, which operation will be performed by means of the cam race 157 of the disk 85 through its connections with the needle carrier 86 which is rotatably mounted on the shaft 60 as above explained. It will be understood that the thread 44 from the bobbin is extended downwardly through the slot 100 in the presser-bar, and the lower or spool thread 78 will have been threaded through the parts 143, 135, 76 and up through the slot 72 of the throat-plate, and together with the bobbin thread will extend at the left hand portion of the stock, before the operation of sewing is commenced, so that after the needle has been caused to pass through the first opening in the stock, the thread-placer 76 will be caused through its connections with the cam disk 85 to be retracted at its upper end, thus placing the lower thread over the needle and allowing its barb or hook 95 to engage said thread, to the end that when the needle is retracted by the further movement of the cam disk 85, it will draw the thread upwardly through the opening in the stock in the form of a loop as shown in Fig. 11 of the drawings. When in this position the takeup finger 57ª will be caused to engage the said loop as shown in Fig. 12 so that in the revolution of the shuttle 42 the horn 42ª thereof will engage the loop and carry it upwardly from the position shown in Fig. 13, around the bobbin until the horn 42ª on the shuttle reaches about the position shown in Fig. 14 when the loop will drop therefrom or be drawn therefrom by reason of the action of the takeup member 135 on the lower thread, which takeup member is actuated by the cam 129 and its connections with said member. It is important to understand that in forming the initial stitch as well as the subsequent stitches, the bobbin thread 44 is held by means of the guide rod 107 at the rear edge of the slot 100 and rearwardly of the needle. This guide rod is actuated longitudinally by the longitudinal movement of the shaft 60 so as to force the bobbin thread rearwardly of the needle at the proper time. By the above described operation it is evident, as shown in Fig. 13, one strand of the loop of the thread 78 will be looped around the bobbin thread 44 as said loop is raised to about the position shown in Fig. 13, and that after the loop has been passed around the bobbin and has assumed about the position shown in Fig. 14, the same strand of the thread 78 will be again looped over the bobbin thread so that when the threads are drawn taut, double-lock-stitches as shown in Fig. 15 will be produced and located in the stock or goods, their location with respect to the stock being regulated by the tension device and by the action of the takeup member 135 on the lower thread. The feed and length of the stitches can be regulated by adjusting the screw 148 in the rear end of the arm 145 so as to give a longer or shorter movement to the shaft 60 on which the awl carrier is mounted.

Having thus fully described my invention, what I claim as new and desire to secure by Letters Patent is—

1. In a leather stitching machine, the combination with a main frame, of a throat-plate longitudinally mounted thereon, a presser-foot-bar movably located above said plate and having a slot therein, a thread guiding rod carried by said bar and located at the rear portion of the slot therein, and longitudinally with respect to said slot, and means to reciprocate said rod.

2. In a leather stitching machine, the combination with a main frame, of a throat-plate horizontally mounted thereon, a presser-foot-bar movably located above said plate and having a slot therein, a thread-guiding rod carried by the said bar, a shaft journaled near the throat-plate, an awl-carrier fixed to said shaft, an awl on said carrier, a needle-carrier on said shaft, a needle on the carrier therefor, means to turn and reciprocate said shaft, means to rock the needle carrier, and means to reciprocate the thread-guiding-rod.

3. In a leather stitching machine, the combination with a main frame, of a throat-plate horizontally mounted thereon, a presser-foot-bar horizontally located above said plate and having a slot therein, a thread-guiding-rod carried by the said bar and located longitudinally with respect to the slot in said bar, a shaft journaled near the throat-plate, an awl and a needle carrier mounted on said shaft, an awl and a needle carried by said carriers, the awl carrier being fixed to said shaft and the needle carrier loosely mounted thereon, means to turn and reciprocate said shaft, means to rock the needle carrier, and means engaging the thread guiding rod and co-acting with said shaft to reciprocate said rod in the longitudinal movement of said shaft.

4. In a leather stitching machine, the combination with a main frame, of a throat-plate horizontally mounted thereon, a presser-foot-bar movably located above said plate and having a slot therein, a thread guiding rod carried by the said bar and located longitudinally thereon at the rear portion of the slot therein, a shaft journaled near the throat-plate, an awl carrier fixed to said shaft, an awl on said carrier, a needle carrier carried on said shaft, a needle on the carrier therefor, means to reciprocate and turn said shaft, means to rock the needle carrier, and a pivotally mounted and spring actuated member engaging at one of its ends the thread guiding rod and contacting with one end of said shaft.

5. In a leather stitching machine, the combination with a main frame, of a throat-plate horizontally mounted thereon, a presser-foot-bar movably located above said plate and having a slot therein, a thread guiding rod carried by the said bar and located longitudinally thereon at the rear portion of the slot therein, a shaft journaled near the throat-plate, an awl carrier fixed to said shaft, an awl on said carrier, a needle carrier carried on said shaft, a needle on the carrier therefor, means to reciprocate and turn said shaft, means to locate the needle carrier, a pivotally mounted and spring actuated member engaging at one of its ends a thread-guiding-rod and contacting with one end of said shaft, and means to apply pressure to the presser bar.

6. In a leather stitching machine, the combination with a main frame, of a throat-plate horizontally mounted thereon, a presser-foot-bar movably located above said plate and having a slot therein, a thread guiding rod located longitudinally with respect to the slot in said bar and at the rear portion of said rod, a member adjustably mounted on said rod, a shaft journaled near the throat-plate, means to reciprocate said shaft, and a pivotally mounted and spring actuated member engaging at one of its ends the adjustable member on said rod and adapted to be actuated by said shaft.

7. In a leather stitching machine, the combination with a suitably mounted presser-foot-bar having a slot therein, of a thread-guiding-rod movably mounted on said bar and longitudinally with respect to the slot therein and means to reciprocate said rod.

8. In a leather stitching machine, the combination with a main frame, of a throat-plate horizontally mounted thereon, a shaft horizontally journaled near the throat-plate, a presser-foot-bar mounted on said shaft for vertical movement, means to intermittently apply downward pressure to said bar, a thread guiding rod movably mounted on said bar and located longitudinally with respect to the slot therein, an awl carrier fixed to said shaft, an awl on said carrier, a needle carrier on said shaft, a needle on the carrier therefor, means to turn and reciprocate said shaft, means to rock the needle carrier, and means to reciprocate the thread guiding rod.

9. In a leather stitching machine, the combination with a main frame, of a throat-plate horizontally mounted thereon, a shaft journaled on the main frame rearwardly and transversely of the throat-plate, a crank arm on said shaft, a take-up arm extended from said shaft under the throat-plate and having in its front portion a transverse opening, a driving shaft transversely journaled on the main frame, a cam on said driving shaft, a spring actuated cam-arm vertically mounted near said cam, and a link uniting the upper portion of said cam arm and the crank arm on said shaft.

10. In a leather stitching machine, the combination with a main frame, of a throat-plate horizontally mounted thereon, of a shaft horizontally journaled below the throat-plate, of a thread-placer-arm mounted at its lower end on said shaft and having its upper end extended to near the throat-plate and provided with a transverse opening, a link mounted on said shaft, another link pivotally connected to the first named link, a rod mounted on the main frame and connected at one of its ends to the last named link, a roller on the other end of said rod, a driving shaft horizontally journaled on the main frame, and a cam disk mounted on the driving shaft and adapted to contact at its periphery with the said roller.

11. In a leather stitching machine, the combination with a main frame, of a throat-plate horizontally mounted thereon, of a shaft horizontally journaled below the throat-plate, a thread-placer arm mounted at its lower end on said shaft and having its upper end extended to near the throat-plate and provided with a transverse opening, a link mounted on said shaft, another link pivotally and adjustably mounted on the first named link, a rod mounted on the main frame and connected at one of its ends to the last named link, a roller on the other end of said rod, a driving shaft horizontally journaled on the main frame, and a cam disk mounted on the driving shaft adapted to contact at its periphery with the said roller.

12. In a leather stitching machine, the combination with a main frame, of a presser-foot-bar movably and horizontally mounted thereon, a stub shaft horizontally journaled near said bar, a presser bar mounted on said shaft and extended over the presser-foot-bar, an arm mounted on said shaft and extended therefrom in the opposite direction from the presser bar, a screw adjustably mounted on said arm, a roller carrying hanger swiveled on said screw, a driving shaft journaled on the main frame, and a cam on said shaft adapted to engage said roller.

13. In a leather stitching machine, the combination with a main frame, of a throat-plate horizontally mounted thereon, a slotted presser-foot-bar movably mounted above said plate, a spring actuated stripper arm pivotally mounted for horizontal movement above the presser bar, and means to actuate the stripper bar.

14. In a leather stitching machine, the combination with a main frame, of a throat-plate horizontally mounted thereon, a slotted presser-foot-bar movably mounted above said plate, a needle mounted on the main frame for operation above said plate and bar and through the same, a pick-up arm mounted above the presser bar, and means to operate the pick-up arm.

15. In a leather stitching machine, the combination with a main frame, of a circular casing mounted thereon, a shuttle operating shaft extended into said casing and suitably journaled, a shuttle mounted on said shaft within the casing for rotary movement, a bobbin carried by the shuttle, a pick-up arm mounted on said casing, and means for operating the pick-up arm.

16. In a leather stitching machine, the combination with a main frame, of a throat-plate horizontally mounted thereon, a slotted presser-foot-bar movably mounted above said plate, a thread-guiding arm carried by the said bar along the slot therein, an awl and a hooked needle mounted on the main frame for operation below and above respectively of said plate and bar and through the same, means to raise and move the awl laterally, means to advance and retract the needle, means to move the thread-guiding arm longitudinally, means below the throat-plate to place a thread in position for engagement with the hook of the needle, a pick-up arm operatively mounted above the presser bar and adapted to engage the loop of the thread carried by the needle, a stripper arm operatively mounted above the presser bar and adapted to remove said thread from the needle, a bobbin carrying shuttle rotatably mounted above the presser bar and having a pointed projection to engage a loop of thread and to carry the loop around the bobbin.

17. In a leather stitching machine, the combination with a main frame, of a throat-plate horizontally mounted thereon, a slotted presser-foot bar movably mounted above said plate, a thread-guiding arm carried by the said bar along the slot therein, an awl and a needle mounted on the main frame for operation below and above respectively said plate and bar and through the same, means to raise and move the awl laterally, means to advance and retract the needle, and means to move the thread-guiding-arm longitudinally.

RAYMOND H. RUDOLPH.

Witnesses:
CHAS. C. TILLMAN,
A. E. OLSON.

Copies of this patent may be obtained for five cents each, by addressing the "Commissioner of Patents, Washington, D. C."